United States Patent [19]
Locke

[11] 3,848,104
[45] Nov. 12, 1974

[54] APPARATUS FOR HEAT TREATING A SURFACE

[75] Inventor: Edward V. Locke, Rockport, Mass.

[73] Assignee: Avco Everett Research Laboratory, Inc., Everett, Mass.

[22] Filed: Apr. 9, 1973

[21] Appl. No.: 349,419

[52] U.S. Cl. ...... 219/121 L, 148/1.5 R, 331/94.5 A
[51] Int. Cl. ........................... B23k 9/00, H01s 3/00
[58] Field of Search .............. 219/121 L; 148/1.5 R; 331/94.5 A

[56] References Cited
UNITED STATES PATENTS

| | | | |
|---|---|---|---|
| 3,743,777 | 7/1973 | Hanus | 219/121 LM |
| 3,364,497 | 1/1968 | MacAdam | 219/121 L UX |

*Primary Examiner*—E. A. Goldberg
*Assistant Examiner*—Hugh D. Jaeger
*Attorney, Agent, or Firm*—Charles M. Hogan, Esq.; Melvin E. Frederick, Esq.

[57] ABSTRACT

Apparatus using a high power laser beam for heat treating a surface, such as a metal surface to harden the surface scans the metal surface which has been coated with radiation absorbing material such as carbon, so that the scanned areas of the metal surface are rapidly heated to above the critical temperature of the metal. Since the heating is very shallow, the heated surface cools very rapidly and so the surface is hardened. The intensity profile of a typical high power laser beam is not flat and so as the beam scans the metal surface, heating of the surface across the width of the beam is not uniform. A flat beam intensity profile is obtained in the present invention by dithering (spacially oscillating) the beam continuously as it sweeps the metal surface. The cross-section area of the dithered beam is substantially greater than the cross-section area of the initial beam from the high power laser and the intensity profile across the dithered beam can be tailored and is dependent upon the initial beam intensity profile and the configuration of the dither. The intensity profile across the dithered beam can be further tailored by blocking portions of the dithered beam.

12 Claims, 11 Drawing Figures

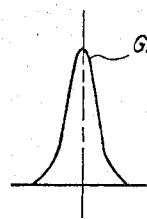
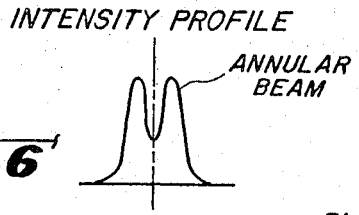
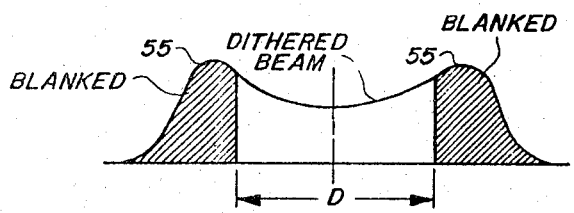
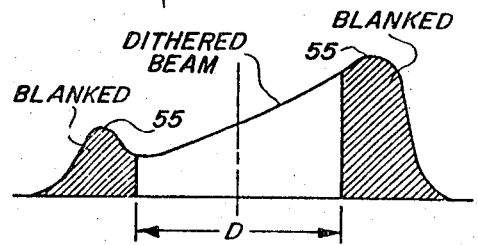
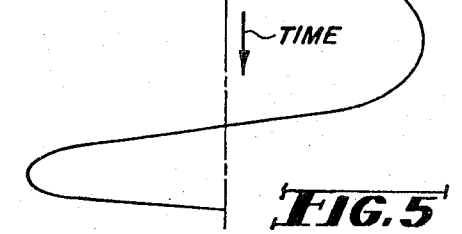
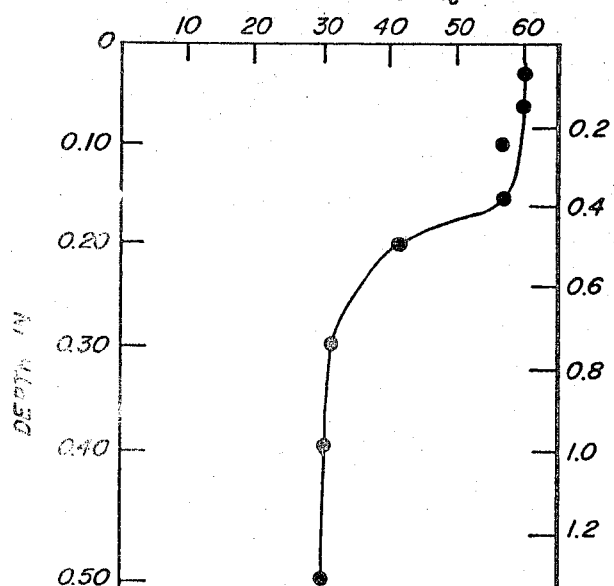
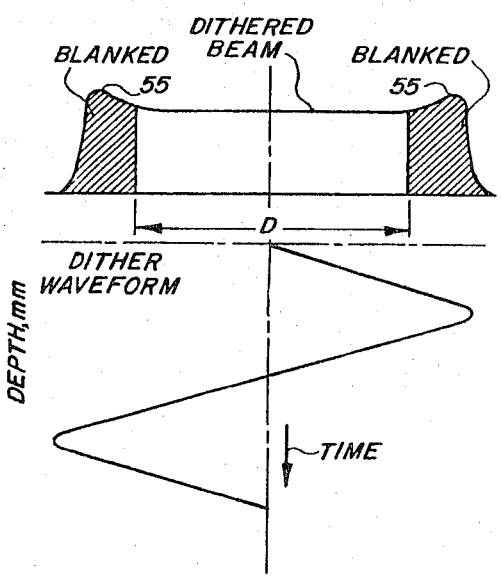

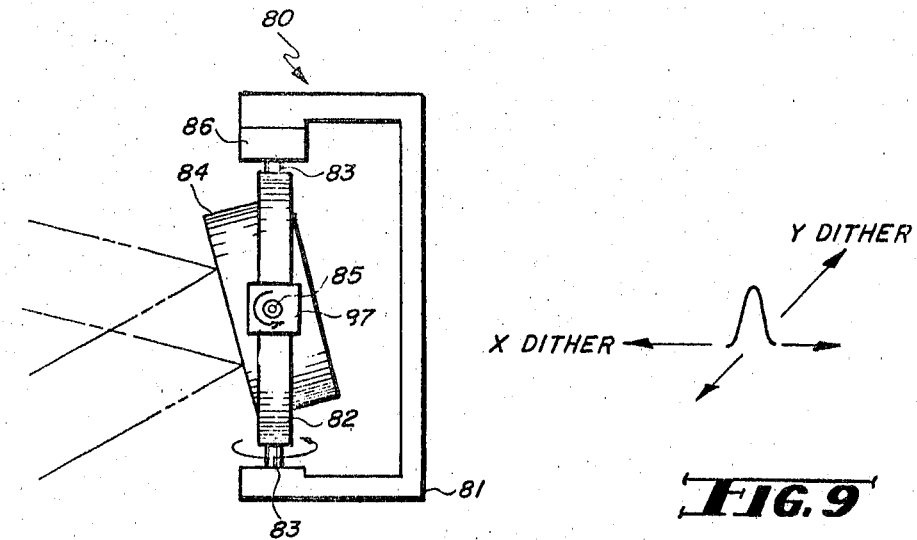
FIG. 9
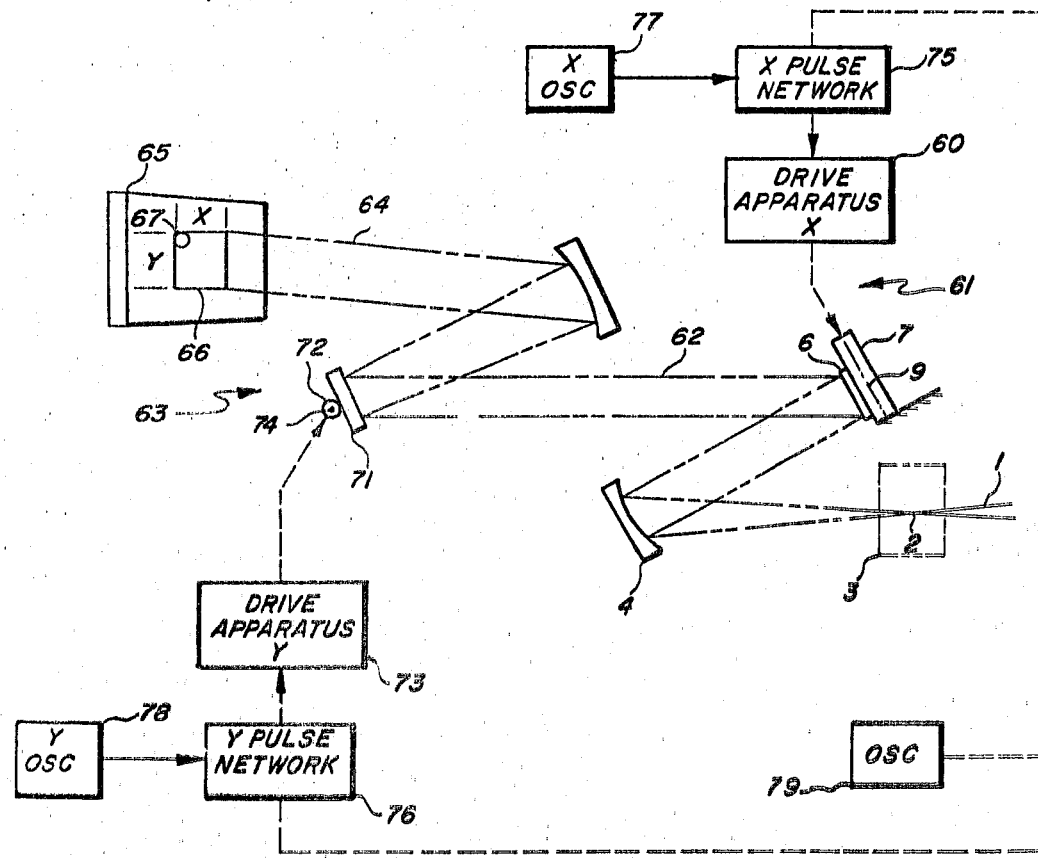
FIG. 11
FIG. 10

APPARATUS FOR HEAT TREATING A SURFACE

BACKGROUND OF THE INVENTION

The present invention relates to methods and apparatus for heat treating metal surfaces and particularly for case hardening metal surfaces by directing a high power laser beam to the surface.

Metals are heat treated in different ways for different purposes. For example, a spring is made stronger by heating the spring above its critical temperature then cooling. A journal or a shaft may be hardened so that it will wear better by a number of techniques. One technique is to heat the shaft in an atmosphere of selected gas or liquid so that materials dissolve from the gas or liquid in the surface metal of the shaft producing a hard surface. The depth of this hardening depends upon the temperature and time of exposure to the atmosphere. This is a conventional process and is called "case hardening." Three commonly used types of case hardening are carburizing, nitriding, and cyaniding. For example, a steel shaft is case hardened by heating the shaft in an atmosphere of $CO_2$ to a temperature in the range of 1,700°F. and at this temperature exposing the shaft to the $CO_2$ gas for a period of an hour or two and then quenching the shaft. Minute amounts of F are liberated on the surface of the hot metal and dissolve in the metal. Upon quenching, the carbon becomes part of the crystalline structure of the metal at the surface.

Case hardening can also be accomplished by induction heating. An induction coil enclosing the metal piece to be case hardened induces an electromagnetic field and the currents in the metal that flow just along the surface and so the surface of the metal piece is preferentially heated. If the surface is thusly heated above the critical temperature and then the piece is quenched, the surface only of the metal piece becomes hardened. Clearly, the conventional techniques for case hardening, whether heating a metal piece in a selected gaseous atmosphere as in the carburizing case hardening process, or by selectively heating only the surface of the piece by induction are quite limited as to the shape and size of the pieces that can be case hardened. For example, it would be most difficult to harden only selected portions of the surface of a shaft using either the carburizing technique or the induction heating technique. Thus by these conventional techniques, odd geometries or selected portions of a piece cannot be preferentially hardened. Furthermore, the ability to control the depth of the case hardening whether using the carburizing technique or the induction heating technique is quite limited.

Recently, it has been proposed to selectively heat the surface of a metal piece by directing a high power laser beam to the surface over areas of the surface which are treated with a material selected to absorb the energy of the beam. The advantages of this technique are that selected areas of the surface of the metal piece can be coated with the material so that when the beam sweeps the surface of the metal piece only those areas covered with the material will be heated. The scanning laser beam selectively heats the surface of the metal piece to a temperature above the critical temperature without raising the bulk temperature of the piece to cause any serious distortion or other affects of heating. The beam may be controlled to heat the surface of the metal piece above the critical temperature to a depth of only a few thousandths of an inch or less. Thereafter, the quenching of the surface occurs by conduction of heat out of the surface into the base metal. since the surface layer heated by the laser beam is so shallow the conduction quench rate is very fast.

Typically, a high power laser beam is a pencil beam that is a small fraction of an inch in diameter. The intensity distribution across the diameter of this beam, also called the intensity profile or intensity shape of the beam depends very much on the type of laser. A common profile or beam shape is a Gaussian shape and in some lasers the pencil beam is annular and so in that case, the intensity profile is U-shaped. Clearly, whether the beam shape is Gaussian shape or U-shaped, any change in the characteristic dimension by, for example, focusing the beam only changes the size of the cross-section of the beam, but does not necessarily change the beam intensity distribution. If the sweeping laser beam directed to the surface of a metal piece has a distinct Gaussian shape, it is quite clear that heating of the metal surface at the center of the beam will be a great deal more intense than heating along the edge of the beam. When such a beam sweeps repeatedly across the metal surface as in a raster-type scan of the surface and the beam scans do not overlap, the surface is not heated uniformly and so the depth of hardening will not be uniform throughout the area of the metal surface scanned by the laser beam. On the other hand, if the repeated scans of the laser beam on the surface of the metal overlap, the portion of a given scan which is overlapped on the next scan of the beam will cool somewhat between the scans and so either will not be heated sufficiently to raise the temperature above the critical temperature or the reheating by the the subsequent scan will anneal the metal at the surface where the repeated scans overlap and so negate the hardening affect at the overlapping areas. The result is that hardening of the scanned metal surface is not uniform in hardness nor in depth of hardening.

One type of high power laser is a flowing gas electron beam energized $CO_2$ laser. A laser of this type is described in U.S. Pat. No. 3,702,973 which issued November 14, 1972 and another described in co-pending application Ser. No. 308,347 filed Nov. 21, 1972 by Locke et al. entitled "Laser System." These lasers produce an annular pencil beam of power on the order of 10 kilowatts and so these lasers are suitable for heating a surface of a metal piece to case harden the surface. The beam from these lasers is annular in shape except at the focal point of the beam where the beam characteristics are that of a Fraunhofer diffraction pattern with a central core containing anywhere from 10 to 80 percent of the power of the beam and the remainder of the beam power being located in concentric Airy rings around the central core. The intensity distribution at locations of the beam other than the focal point depend upon the beam divergence angle and the annular ratio. However, in general, the intensity distribution or profile of this beam always contains rings around a central maximum as well as the possibility of a depression in the middle of the beam due to the near field annular characteristics of the beam. In all cases the intensity distribution or shape of the beam depends on the type of laser oscillator that is used and on the location along the beam relative to the focal point. Most often, however, the intensity profile is not ideal for uniformly heating the surface of a metal piece to case harden the surface. It is one of the objects of the present invention to provide a technique for producing a laser beam of intensity profile that is tailored to a desired shape in view of the use of the beam that is intended.

SUMMARY OF THE INVENTION

In accordance with the present invention, apparatus is provided for spacially oscillating the high power laser beam. This is also referred to as dithering the beam. The spacial oscillation of the beam may be characteristically sinusoidal or sawtooth or a square wave or any other particular characteristic may be selected. The purpose of the spacial oscillation or dithering of the beam is to produce an average intensity of radiation at each point across the spacial configuration that is swept out by the dithering beam and so provide a predetermined intensity profile of the dithering beam. Clearly, the intensity profile of the dithering beam depends upon the intensity profile or the shape of the initial beam and the characteristic of dither.

In a particular embodiment in the present invention which is described herein, the initial laser beam has an approximate Gaussian distribution at its focal point and the spacial oscillation or dithering is sinusoidal. More particularly, the dithering is produced by a plain mirror oscillated back and forth on an axle parallel to the plane of the mirror and transverse to the plane of the dither or spacial oscillation. The cross-section dimensions of the dithered beam produced by this structure is substantially greater than the initial beam and when projected on the target, such as the surface of a piece of metal to be heat treated, the dithering beam covers an area three or more times as large as would be covered by the same beam were it not dithered. The rate of the dither is sufficiently high that the metal surface does not respond to the high speed motion of the beam, but responds to the average intensity of the beam at each point of projection of the dithering beam on the metal surface. In the case where the initial laser beam has a Gaussian intensity profile and the dithering is sinusoidal, the average intensity at each point across the dithering beam projected on the metal surface tends to be flat in the center region, but with sharp spikes at each of the opposite ends. These spikes or wings, can be removed by a blocking aperture between the dithering mirror and the metal surface. The sharp edged beam which exits from the blocking aperture can be imaged on the workpiece by a suitably arranged set of imaging optics. The resulting intensity profile of the dithering beam on the metal surface is then like a square wave being flat on top and dropping sharply at the edges. This is an ideal intensity profile for sweeping a metal surface with adjacent contiguous sweeps to uniformly heat the surface over the area swept, line after line, by the dithering laser beam. A similar treatment of annular beam produces analogous results.

For particular applications, it may be preferred that the intensity profile across the dithered laser beam be other than a square wave. For example, it may be preferred that the intensity profile across the dithered beam be a sawtooth shape. In that case, the dither would not be sinusoidal, but have a wave shape selected to cause the laser beam to spend more time on one excursion of each cycle of dither than on the opposite excursion. The intensity profile of the dithered laser beam could also be made substantially annular in shape by using two dither mirrors orthogonally oriented and driven in proper phase quadrature so that the laser beam is dithered by driving it in a circle, or other Lissajous patterns.

It is an object of the present invention to provide in a laser system apparatus for tailoring the intensity profile of the output laser beam.

It is another object of the present invention to provide an improved high power laser system for heat treating a surface.

It is another object to provide an improved high power laser system for scanning a metal surface to case harden the surface.

It is another object of the present invention to provide a high power laser system for heating a surface to a prescribed and uniform temperature and depth.

It is another object of the present invention to provide apparatus for selectively heat treating metal parts.

It is another object of the present invention to provide apparatus for selectively case hardening surface areas of a metal piece.

These and other objects and features of the present invention will be more apparent in view of the specific description of embodiments of the invention which represent the best known uses and applications of the invention all taken in conjunction with the figures described below.

DESCRIPTIONS OF THE DRAWINGS

FIG. 3 shows a typical intensity profile of a high power laser beam having a Gaussian distribution;

FIG. 4 shows the intensity profile across the dithered laser beam and a portion thereof which is blocked by an aperture between the dithering mirror and the workpiece and the sinusoidal spacial oscillation that produces this dithered beam intensity profile;

FIG. 5 shows a sawtooth shaped intensity profile produced by the same beam as in FIG. 3, but dithered using a non-sinusoidal dither characteristic;

FIG. 6 shows a typical intensity profile of an annular or hollow laser beam;

FIG. 7 shows a graph of hardness versus depth for a specimen of cast iron;

FIG. 8 shows a top hat shaped intensity profile of a dithered laser beam using a non-sinusoidal dither characteristic;

FIG. 9 shows a laser beam profile and X and Y or double dither directions;

FIG. 10 shows a diagram and pictorial view of a double dither system; and

FIG. 11 shows a gimbal structure for sweeping a single or double dithered beam across the workpiece in any desired pattern.

DESCRIPTION OF EMBODIMENTS OF THE INVENTION

Figure 1:
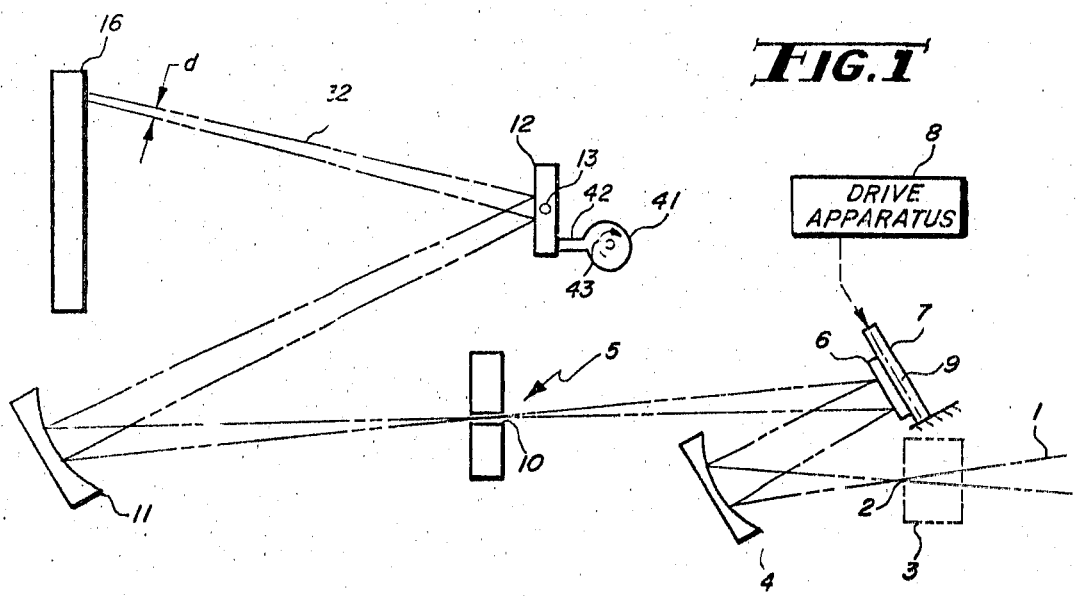
FIG. 1 is a diagram of an optical system for dithering a laser beam, shaping the intensity profile of the dithered beam and sweeping the dithered beam back and forth across a moving workpiece.

The high power laser used in the present invention constructed as described in the above-mentioned U.S. Pat. No. 3,702,973 and the above-mentioned pending application Ser. No. 308,347 provides a diverging annular laser beam diverging from a focal point located at an "Aerodynamic Window." The aerodynamic window isolates the laser structure from the external optics shown in FIG. 1. The construction and use of an aerodynamic window at the output of such a laser is described in co-pending application Ser. No. 249,607 by E. Hoag et al. filed May 2, 1972, entitled "Aerodynamic Laser Window." The laser beam 1 within the laser enclosure is focused at point 2 in the aerodynamic window 3. The focal point 2 is the primary focal point and is re-imaged by an external mirror 4 as a much larger focal point located at position 5 called the secondary focal point. Between the refocusing mirror 4 and the secondary focal point is the dither mirror 6 which is mounted on a torsion bar or other spring or bearing mount 7 and made to vibrate at a preselected frequency which may be the natural vibration frequency of the torsion bar or spring by electromechanical drive apparatus 8. The dither drive is such that the dither mirror 6 vibrates about an axis 9 substantially in the plane of the mirror and transverse to the incident laser beam focused by mirror 4. Thus, the beam from the dither mirror spacially oscillates or dithers on an arc line which is transverse to the plane of the drawing in FIG. 1.

Figure 2:
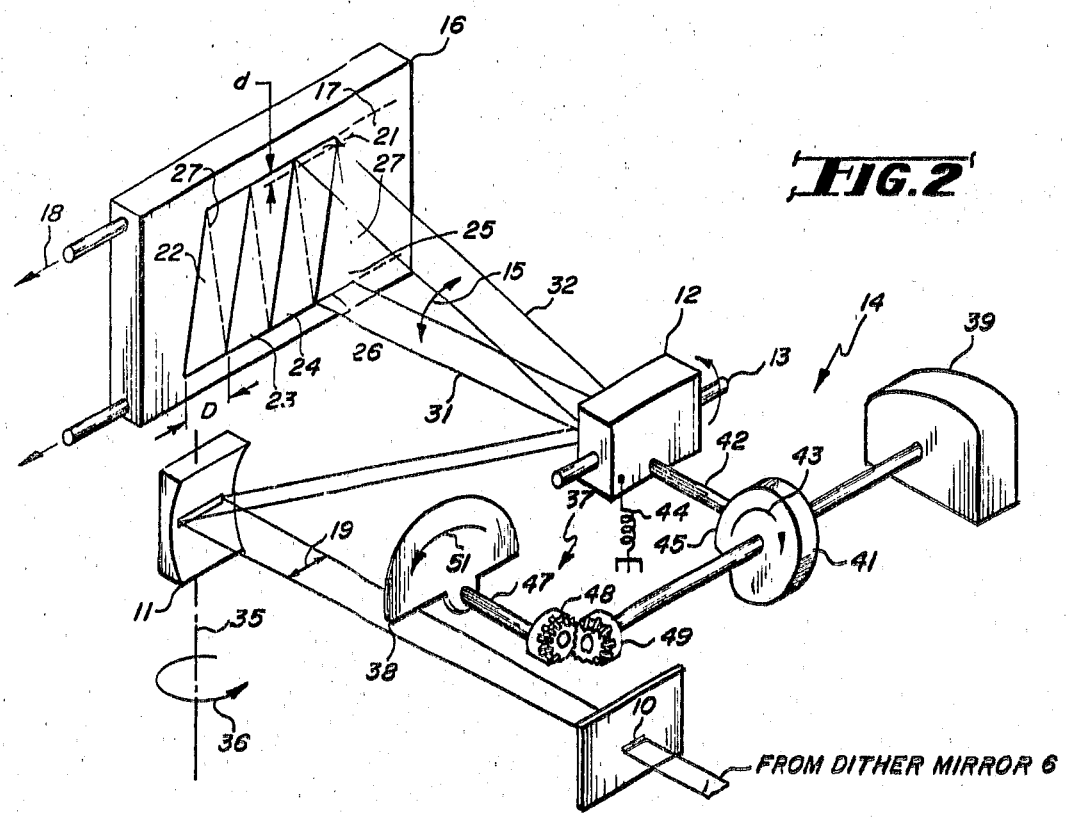
FIG. 2 is a pictorial view of part of the system shown in FIG. 1 to show the relative directions of the dither, the dithered beam sweep and the movement of the workpiece.

The dithering beam from mirror 6 passes through an aperture 10 at the second focal point 5, and then to a second focusing mirror 11 and from that to the sweep mirror 12 that relatively slowly oscillates on its axis 13 as it is driven by mechanism 14 and causes the beam to scan back and forth over an arc 15 (see FIG. 2). The sweep rate of mirror 12 is much slower than the dither frequency of mirror 6. The axis 13 of mirror 12 may be transverse or parallel to the plane of the drawing in FIG. 1.

The sweep rate of mirror 12 is synchronized with the movement of the workpiece 16 to which the dithered beam is directed. This synchronism takes into account also the dimensions of the dithered beam as projected on the workpiece. This is shown in FIG. 2 which is a pictorial view of focusing mirror 11, sweep mirror 12 and the workpiece 16. The beam from the sweep mirror 12 is painted across a target area 17 on the workpiece. The workpiece is moved in the direction of arrow 18 which is perpendicular to the direction of sweep of the dithered beam and is parallel to the dither direction represented by arrow 19. By suitable adjustments of the magnitude of the dithered spot, represented by the elongated spot 21, the sweep rate of the sweep mirror 12 and the velocity of the workpiece in the direction 18, complete coverage of the scanned area 17 of the workpiece is accomplished. This coverage is shown in FIG. 2 by the solid line traces 22 to 25 which are side by side scans of the dithered laser spot 21. Each of these scans begins at the lower end such as the lower end 26 of scan 25 and proceeds upward and slightly to the right so that this scan ends at the position of the dithered spot 21. The dithered beam then very abruptly swings to the bottom position as at 26 and is ready for the next upward scan. The abrupt retrace lines from each of the side by side scans to the next scan are represented by broken lines 27. Clearly, the scanning dithered spot 21 from mirror 12 continually scans the same spacial arc represented by arc line 15 and this scan is from the dithered beam position 31 to 32 at a predetermined rate. In order to provide the side by side contiguous scans 22 and 25 shown in FIG. 2, the scanning time of the dithered beam from the bottom to the top of each scan, times the velocity of the workpiece in the direction 18 should equal the width D of the dithered laser beam. Furthermore, the beam must retrace from the top end of the scan to the bottom in readiness for the next upward scan in a period of time much shorter than the scan time, so that the workpiece 16 has not moved significantly. At the same time, the dithered laser beam must not retrace, move across or overlap a completed scan except at very high speed, much higher than the scan speed. Some techniques for accomplishing this are briefly as follows: (1) As shown in FIG. 2, the dithered laser beam can be blanked or blocked during the retrace. (2) Without blanking the beam, the retrace can be at very high speed compared with the trace, so the additional radiant energy delivered to each trace area by the retrace beam is insignificant. This fast retrace can be accomplished by appropriate cam shape 41. An example of such a cam is an Archimedes spiral, which provides a linear sweep, with a fast retrace. When a fast retrace is used, gears 48 and 49, shaft 47 and disc 38 are not necessary and may be omitted. (3) The slow scans followed by fast retrace may be synchronized with intermittent motion of the workpiece in the direction 18 so that the workpiece moves relatively slowly during a scan and moves rapidly during retrace with the result that the scans are side by side and contiguous as shown in FIG. 2. (4) The sweep mirror 12 and the drive 14 for the sweep mirror may be such that the spacial arc formed by the scanning dithered beam during retrace may not be the same as the arc swung by the beam during a scan. For example, the sweep mirror 12 may tilt on its axis 13 to produce a scan such as scan 25 from the bottom 26 to the top at 21 of the scan and then the mirror 12 would tilt about another axis or the axle 13 would shift and the mirror 12 quickly tilted about the new axis to produce the retrace 27. (5) The forcusing mirror 11 could be tilted about an axis 35 in a direction indicated by arrow 36, just during the retrace cycle so as to return the dithered beam at the end of retrace to the bottom of the scanned area contiguous and alongside the previously completed trace and in readiness for the next trace. At that point, the focus mirror 11 would be returned to its initial position during the next scan by sweep mirror 12. Clearly, this technique requires a synchronism between the drive to focus mirror 11 and the drive to the sweep mirror 12.

This is one of the techniques that could be employed to insure that the area covered by each successive scan of the dithered laser beam, such as scan 22 to 25, receive uniform intensity laser radiation throughout and so the surface of the workpiece so scanned is dithered uniformly to a uniform depth by the scanning dithereed laser beam. FIG. 2 shows mechanical structure driven in synchronism with the drive mechanism 14 that drives the sweep mirror 12, for blocking the dithered laser beam between the aperture 10 and the focusing mirror 11 so that the beam is blocked during retrace or at least immediately following the high speed retrace for a period of time sufficient to allow the workpiece to shift until the beam is ready to begin another trace. This mechanism, denoted generally 37, includes a blanking disc 38 that is rotated in synchronism with the drive 14 for the sweep mirror 12. The drive 14 includes a drive motor 39 driving a cam 41 in contact with the sweep mirror tilt rod 42. In operation, as the cam is turned in the direction of arrow 43, the tilt rod 42 moves back and forth tilting the mirror 12 against the action of the mirror spring 44. The position of this cam shown in FIG. 2 is at the end of a scan with the tilt rod 42 at the step 45 of the cam. When the cam rotates through this step, the mirror 12 very abruptly swings the beam from the top of the scanned area 17 of the workpiece to the bottom over the retrace path 27. Scanning then stops while the workpiece moves sufficiently to place the dithered beam at the proper position for the next scan and during this pause the beam is preferably blanked so that it does not continue to play on one area of the workpiece before commencing the next scan. The beam is blanked during the period by the blanking disc 38 which rotates on a shaft 47 with gear 48. Gear 48 is driven by bevel gear 49 on the shaft from cam 41. As the cam rotates in the direction of 43, the blanking disc 38 rotates in the direction 51. The synchronism is such that at or immediately following the tilt of the sweep mirror 12 at retrace, the disc 38 blanks the laser beam during the following one-half cycle of rotation of the cam at which time the beam is then at the bottom of the scanned area of the workpiece and in position to commence the next sweep.

The average intensity gradient across the dithered laser beam (across the dimension D of the dithered beam) is determined principally by the wave form of the dither cycle that drives the mirror 6. As has been described above, this average intensity profile also depends upon the profile of the initial laser beam. As a rule, however, the average intensity profile across the dithered beam will exhibit peaks or wings at the ends and these are undesirable where the purpose of the dithered beam is to sweep a pattern on a workpiece as shown in FIG. 2 and produce uniform heating to a uniform depth in the swept area of the workpiece. These wings or peaks shown as 55 in FIG. 4 can be blocked by the aperture 10. This aperture can be made variable and so adjustments can be made in each case by varying this aperture to tailor the intensity profile of the dithered beam.

The dithered beam intensity profile shown in FIG. 4 is accomplished using an initial beam having an approximately Gaussian intensity profile dithered a distance about five times the initial beam diameter and a sinusoidal dither wave form characteristic. If the natural spot size of the laser beam in the system shown in FIGS. 1 and 2, as the beam is projected on the workpiece without dither and without sweep, is on the order of 3/16 of an inch in diameter, then the dimension D of the dithered beam on the workpiece would be on the order of one inch. In this case, the total dimension of the dither with the aperture 10 removed would be greater than one inche, because the aperture removes the end intensity peaks of the dithered beam shown in FIG. 4.

While a beam having a Gaussian intensity has been shown by way of example, it is to be understood that the invention is not limited to beams with such an intensity distribution. Thus, an annular beam having an intensity profile shown in FIG. 6 may be dithered to provide at least substantially if not exactly the same intensity profile as that shown and described in FIG. 4.

As an example of one use of the structure shown in FIGS. 1 and 2, consider a workpiece which is cast iron and the target a smooth surface area of the cast iron coated with a material such as manganese phosphate which is highly absorptive of 10.6 micron radiation. If the initial laser beam is a continuous wave beam at 10.6 microns wavelength, from a laser system such as referred to hereinabove and the beam power is about 10 kw, the dither frequency 300 cycles per second and the sweep speed or velocity across the workpiece surface approximately 200 inches per minute, there results a substantial hardening of the surface. For example, if the hardness of the surface of the cast iron were about 30 on the Rockwell C scale before this treatment, the surface hardness would be found to have been increased to 55–60 on the same Rockwell C scale after treatment. This is about as hard as this material can ever be made. A graph of hardness versus depth in such a cast iron surface is illustrated in FIG. 7. As can be seen, the hardness extends into the surface a dimension of approximately 0.015 inches. This treatment requires no quenching because only a very small bulk of the cast iron is heated above the cast iron critical temperature and since this heated bulk has a very large surface to volume ratio, it cools very rapidly after the beam passes and so a surface hardness is achieved which is as high as achieved heretofore using conventional techniques for heating followed by quenching.

The intensity profile of the dithered beam can be tailored to have just about any shape. The intensity profile shape shown in FIG. 4 is useful for heat treating a metal surface to harden the surface uniformly just as described herein. The dithered intensity profile could be tailored to have the shape shown in FIG. 5. This yields an approximately sawtooth or ramp shaped profile when the wings at the ends are blocked by an aperture. For example, instead of driving the dither mirror in a sinusoidal fashion, which tends to have a lower point in the middle and peaks at the edges, the approximately sawtooth profile shown in FIG. 5 can be generated with appropriate mirror bearing mounts and signal forming networks for energizing an electromechanical actuator replacing the torsion bar 7 and mechanical drive 8 for the torsion bar. For example, the dither mirror 6 could be mounted on a rotating bearing, and driven directly by an electromechanical actuator which is energized by electrical pulses from the network, these pulses being performed as necessary to yield the desired dither cycle. As a further example, the top-hat shaped dither beam intensity profile shown in FIG. 8 could be achieved using a specially shaped energizing pulse with impulses at each end. This would cause the electromechanical actuator to drive the dither mirror 6 so that the mirror would change directions from clockwise to counterclockwise very rapidly and then maintain constant velocity through further rotation of the mirror in completing the dither cycle.

The techniques described above provide a dithered laser beam where the dither is in one direction that is transverse to the beam, and the dithered beam is caused to sweep a workpiece transverse to the dither direction. The beam can also be dithered in two orthogonal directions as shown in FIG. 9 using two orthogonally oscillated dither mirrors as shown in FIG. 10 and so provide at the surface of a workpiece a large beam area of substantially flat intensity profile across the beam area in any direction.

The system in FIG. 10 includes a portion of the system shown in FIG. 1. It includes the aerodynamic window 3, focusing mirror 4 and dither mirror 6 mounted on torsion bar 7 driven by actuator 60 so that this mirror vibrates about axis 9. This is the X dither system denoted generally by 61 and produces at 62, a beam dithered in the X direction. A similar dither system, the Y system, denoted generally 63, dithers the beam in the Y direction so that the double dithered beam 64 projected on workpiece 65 produces a large spot 66 which is substantially larger in both the X and Y directions than the undithered beam spot size projected on the workpiece, denoted 67.

The Y dither system 63 includes dither mirror 71 mounted on torsion bar 72 driven by the Y actuator 73 so that this mirror vibrates about axis 74. The axes 9 and 74 are here called the X and Y axes respectively. In this system as shown, the X and Y actuators 60 and 73, respectively, are not synchronized and are energized by different pulse shaping networks 75 and 76, respectively.

The relatively large substantially rectangular or square shaped spot 66 is produced when the X and Y oscillators 77 and 78 are at different frequencies and so are not synchronized. If these oscillators are replaced by a single oscillator 79 which feeds both the X and the Y pulse networks, the shape of the dithered spot projected on the workpiece will depend upon the phase of oscillation of each of the dither mirrors 6 and 71 as well as the amplitude of dither.

For example, where a single oscillator is used (the X and Y fequencies are equal) and the dither mirrors are oscillated in phase quadrature and equal amplitudes, the projected spot will be a ring. In the same case where amplitudes are not equal, the spot will be an ellipse. Where one frequency is twice the other, the spot can be in the shape of a figure eight. Clearly, by varying the X and Y dither frequencies, amplitude and phase, all the well-known Lissajous figure shapes can be produced and projected on the workpiece.

The double dither (dither in two orthogonal directions) could also be achieved using a single dither mirror mounted on a double gimbal with the X drive apparatus driving one gimbal axis and the Y drive apparatus driving the other gimbal axis. This structure is shown in FIG. 11. The double gimbal 80 includes an outer gimbal 81 and an inner gimbal 82 pivoting on axle 83 supported within gimbal 81. The dither mirror 84 pivots on Y axle 85 supported within gimbal 82. The X drive 86 drives the inner gimbal with respect to the outer in oscillation and the Y drive 87 drives the mirror in oscillation with respect to the inner gimbal.

The two systems of dithering shown in FIGS. 10 and 11 could be used in combination. In one embodiment, the system of FIG. 10 would produce a doubly dithered beam which would be swept over the workpiece in any desired pattern by the system shown in FIG. 11. In another embodiment, the system shown in FIG. 11 would produce the doubly dithered beam while the system of FIG. 10 would sweep the desired pattern over the workpiece.

The various embodiments of the present invention described herein all make use of the same technique which is to dither a laser beam and so broaden the laser spot producing a predetermined intensity profile across the broadened spot. This technique as incorporated in the structure described herein is useful to heat treat a metal surface to harden the surface. Other techniques to dither the laser beam in one or two directions and to sweep the dithering beam across a target or project a stationary dithered beam on a target could be employed without deviating from the scope of the invention as set forth in the appended claims.

I claim:

1. In a laser system, means for changing the intensity profile across an output laser beam to a different controlled intensity profile comprising:
   a. reflective means for receiving and reflecting an output laser beam having a given intensity profile;
   b. means for spacially oscillating said reflective means over a given reflector spacial path at a predetermined rate whereby an output laser beam reflected by said reflecting means is spacially oscillated over a laser beam path; and
   c. means having a blocking aperture for blocking at least a portion of said spacially oscillated laser beam whereby the average radiation intensity at points along the unblocked portion of said laser beam path of said spacially oscillated laser beam exiting from said aperture define said controlled intensity profile.

2. In a laser system as in claim 1 wherein, said laser beam path is an arc of given angle.

3. In a laser system as in claim 2 wherein, the spacial oscillation is from one end to the other of said arc and from the said other to the one end thereof.

4. In a laser system as in claim 1 and further including, means for spacially sweeping said spacially oscillated laser beam, whereby, said spacially oscillating laser beam sweeps along a target path.

5. In a laser system as in claim 4 wherein, the directions of spacial oscillation and spacial sweep are orthogonal to each other.

6. In a laser system as in claim 5 wherein, the amplitude of said spacial sweep is substantially greater than the amplitude of said spacial oscillation.

7. Apparatus as in claim 1 wherein, the means for spacially oscillating includes means for spacially oscillating the beam in each of two substantially orthogonal directions.

8. Apparatus as in claim 7 wherein, the spacial oscillations in the two directions are at different frequencies, whereby a controlled intensity profile across the spacially oscillated beam is produced in both said directions.

9. Apparatus as in claim 7 wherein, the spacial oscillations in the two directions are at the same frequencies and in phase quadrature, whereby the spacially oscillated beam is annular in cross-section.

10. Apparatus as in claim 7 wherein, the means for spacially oscillating the beam includes a mirror mounted to the inner gimbal of a double gimbal and drive means at the gimbal axes for spacially oscillating the mirror in each of two orthogonal directions.

11. Apparatus for uniformly heating an area of a surface comprising:
    a. means for producing an intense laser beam having a given intensity profile, b. means along the optical path of said laser beam for spacially oscillating in a controlled manner the laser beam over a given spacial path, and c. means having a blocking aperture for blocking a portion of said spacially oscillated laser beam whereby the average radiation intensity at points along the unblocked portion of said spacial path of said spacially oscillated beam exiting from said aperture define a controlled intensity profile different from said given intensity profile and having sharply dropping edges.

12. Apparatus as in claim 11 and further including, means for spacially sweeping said spacially oscillated laser beam, whereby said spacially oscillating laser beam sweeps along a target path.

* * * * *

PO-1050
(5/69)

UNITED STATES PATENT OFFICE
CERTIFICATE OF CORRECTION

Patent No. 3,848,104                    Dated November 12, 1974

Inventor(s) Edward V. Locke

It is certified that error appears in the above-identified patent and that said Letters Patent are hereby corrected as shown below:

Column 1, line 26, for "F" read --carbon--; Column 2, line 3, for "since" read --Since--; Column 6, line 1, for "22 and 25" read --22 to 25--; Column 6, line 39, for "forcusing" read --focusing--; Column 6, line 54, for "dithered" read --heated--; Column 6, line 56, for "dithereed" read --dithered--; Column 8, line 46, for "performed" read --preformed--.

Signed and sealed this 18th day of March 1975.

(SEAL)
Attest:

RUTH C. MASON
Attesting Officer

C. MARSHALL DANN
Commissioner of Patents
and Trademarks